United States Patent
Schmotter (10) Patent No.: US 9,790,967 B2
(45) Date of Patent: Oct. 17, 2017

(54) ROTARY ACTUATOR WITH PASS-THROUGH FLUID CIRCUIT

(71) Applicant: Jarraff Industries, Inc., St. Peter, MN (US)

(72) Inventor: Jacob Schmotter, Cleveland, MN (US)

(73) Assignee: Jarraff Industries, Inc., St. Peter, MN (US)

( * ) Notice: Subject to any disclaimer, the term of this patent is extended or adjusted under 35 U.S.C. 154(b) by 585 days.

(21) Appl. No.: 14/502,561

(22) Filed: Sep. 30, 2014

(65) Prior Publication Data
US 2015/0089819 A1    Apr. 2, 2015

Related U.S. Application Data

(60) Provisional application No. 61/884,589, filed on Sep. 30, 2013.

(51) Int. Cl.
| | | |
|---|---|---|
| *A01G 3/08* | (2006.01) | |
| *F15B 15/06* | (2006.01) | |
| *A01G 23/095* | (2006.01) | |
| *B27B 5/10* | (2006.01) | |
| *F15B 15/08* | (2006.01) | |
| *F15B 15/20* | (2006.01) | |

(52) U.S. Cl.
CPC ............ *F15B 15/068* (2013.01); *A01G 3/088* (2013.01); *A01G 23/0955* (2013.01); *B27B 5/10* (2013.01); *F15B 15/08* (2013.01); *F15B 15/20* (2013.01)

(58) Field of Classification Search
CPC ...... A01G 23/0955; A01G 3/088; A01G 3/08; B27B 5/10; F15B 15/08; F15B 15/20; F15B 15/068; Y10S 83/928
See application file for complete search history.

(56) References Cited

U.S. PATENT DOCUMENTS

| | | |
|---|---|---|
| 3,530,769 A | 9/1970 | Gurevich |
| 3,572,746 A | 3/1971 | Mueller |
| 3,913,304 A | 10/1975 | Jodoin |

(Continued)

FOREIGN PATENT DOCUMENTS

| | | |
|---|---|---|
| CA | 1161797 | 2/1984 |
| EP | 0318805 | 6/1989 |
| WO | 2012177261 | 12/2012 |

OTHER PUBLICATIONS

Search Report issued Jul. 9, 2015 in related European Patent Application 14187067.5.

(Continued)

*Primary Examiner* — Logan Kraft
*Assistant Examiner* — Abiy Teka
(74) *Attorney, Agent, or Firm* — Haugen Law Firm PLLP (57) ABSTRACT

A mobile apparatus with a fluid pressure-operated implement mounted at a distal end of a boom includes a connection apparatus for selectively rotating the implement about an actuator axis at the distal end of the boom. The connection apparatus includes a rotary actuator and a pressurized fluid circuit for delivery of pressurized fluid through the rotary actuator to the implement. The pressurized fluid circuit includes channels establishing a fluidic connection axially through the rotating shaft of the rotary actuator. The pressurized fluid circuit facilitates passage of pressurized fluid through an internal, protected environment to the implement.

22 Claims, 10 Drawing Sheets

(56) References Cited

U.S. PATENT DOCUMENTS

| | | | | |
|---|---|---|---|---|
| 4,411,070 | A | * | 10/1983 | Boyum .................... A01G 3/08 144/24.13 |
| 4,823,852 | A | | 4/1989 | Langford |
| 4,987,825 | A | | 1/1991 | Weyer |
| 5,337,847 | A | | 8/1994 | Woods et al. |
| 5,447,095 | A | * | 9/1995 | Weyer .................... F15B 15/068 29/888.06 |
| 5,489,114 | A | | 2/1996 | Ward et al. |
| 5,501,257 | A | | 3/1996 | Hickman |
| 6,604,796 | B2 | | 8/2003 | Boyum |
| 6,641,235 | B2 | | 11/2003 | Boyum |
| 7,367,368 | B2 | * | 5/2008 | Smitherman ............ A01G 3/08 144/34.1 |
| 7,753,382 | B2 | | 7/2010 | Choi |
| 2012/0279614 | A1 | | 11/2012 | Terrell |

OTHER PUBLICATIONS

"Brand New SkyTrim Units," www.kwtruckequipment.com/skytrim.htm, last accessed Aug. 25, 2010.

News.com.au, "Neal's Monster Tree Trimmer", http://www/weeklytimesnow.com.au/article/2009/12/23/144051<machine.html, last accessed Aug. 25, 2010.

Skylift. "Skylift Mini-Arborist", http://www.skyliftus.com/mini-arborist.php, last accessed Aug. 25, 2010.

TSE International, Inc., "TR700-70ft Track Mounted Tree Trimmer—'The Cajun Cutter'". http://www.tse-international.com/catalogue.php?category_id=1952&object_id=37043. Last accessed Aug. 25, 2010.

Skylift. "Skylift Mini-Arborist 39" http://www.skyliftus.com/Product%20Info/MA39.pdf, last accessed Aug. 25, 2010.

Helac Corporation. "Helical, Hydraulic Rotary Actuators". Copyright 2010.

* cited by examiner

ROTARY ACTUATOR WITH PASS-THROUGH FLUID CIRCUIT

CROSS-REFERENCE TO RELATED APPLICATIONS

This application claims priority to U.S. Provisional Patent Application Ser. No. 61/884,589, filed on Sep. 30, 2013 and entitled "Rotary Actuator with Pass-Through Fluid Circuit," the contents of which being incorporated herein in their entirety.

FIELD OF THE INVENTION

The present invention relates to fluid-powered rotary actuators generally, and more particularly to rotary actuators for rotatably coupling a pressurized fluid-operated implement to a base structure. The present invention further relates to mobile apparatus employing such rotary actuators.

BACKGROUND OF THE INVENTION

Rotary helical splined actuators have been employed to achieve high-torque output from a piston driven along a linear path. In typical arrangements, the actuator includes a cylindrical body with a rotary output shaft extending coaxially within the body, with an end portion of the shaft providing the drive output. An elongated angular piston sleeve has a sleeve portion splined to cooperate with corresponding splines on a ring gear attached to the side wall of the body, as well as with splines on an outer surface of the output shaft. The piston sleeve is reciprocally mounted within the body, such that pressurized fluid may be applied to opposing sides of the head to produce reciprocal axial movement of the piston sleeve.

As the piston sleeve linearly reciprocates in an axial direction within the body, the outer splines of the sleeve portion engage or mesh with the splines of the ring gear to cause rotation of the sleeve portion. The resulting linear and rotational movement of the sleeve portion is transmitted through the inner splines of the sleeve portion to the splines of the shaft to cause the shaft to rotate. Bearings rotatably support the shaft relative to the body.

Fluid-powered rotary actuators find wide application to move, support, and position rotary loads. Example industries in which rotary actuators are widely used include agriculture, construction, material handling, and mining. A common use for fluid-powered rotary actuators is in connection with a boom, wherein the actuator is employed to rotate an implement mounted to a distal end of the boom about the output shaft axis. Examples include aerial work platforms for platform, basket, and jib rotation, as well as construction equipment and agricultural harvesters for the positioning of boom attachments.

Certain boom attachments require the supply of pressurized fluid for operation, such as working implements. A particular example is tree-trimming apparatus, which includes a large diameter circular saw mounted at the distal end of the boom, and powered by a high speed hydraulic motor. Pressurized fluid supply lines must therefore extend between the pressurized fluid-powered motor and a pressurized fluid source. Pressurized fluid supply lines positioned along the boom exterior can become entangled among foreign objects at the worksite, and may also be at risk for damage through puncture or cutting. Such risks and drawbacks are exacerbated when the boom has a telescoping function, wherein the pressurized fluid tubing must be provided with sufficient/excess length to accommodate the adjustable extension of the boom.

It would therefore be desirable to supply working implements at the end of a boom with pressurized fluid lines that are protected from interference and damage. The pressurized fluid supply lines may be so protected within the interior of the boom, wherein a need exists to communicate pressurized fluid from within the interior of the boom to an operating implement, and particularly in circumstances wherein the operating implement is rotatably coupled to the boom with one or more rotary actuators.

SUMMARY OF THE INVENTION

By means of the present invention, pressurized fluid for operating a working implement may be communicated through a rotary actuator. A fluid circuit with first and second channels extends through the rotary actuator and is fluidically coupled to feed and delivery manifolds to properly receive and distribute the pressurized fluid. The feed manifold may receive and distribute the pressurized fluid at an interior environment such as within a boom lumen, and the delivery manifold may receive and distribute pressurized fluid at an exterior environment, such as external to a boom and proximate to the working implement. Pressurized fluid may therefore be supplied to a pressurized fluid-driven motor for operating the implement through an interior of the boom, and through a rotary actuator.

A rotary actuator for selectively rotating a pressurized fluid-driven implement about an actuator axis includes a housing defining a chamber and a splined shaft having first and second ends extending axially through the chamber for rotation relative to the housing about the actuator axis. One of the housing and the shaft are configured for coupling to the implement. A piston is mounted in the chamber, and is axially responsive to pressurized fluid in the chamber to reciprocally axially drive a splined member between the splined shaft and a grooved portion in the chamber. Meshed engagement among the splined shaft, the splined member, and the grooved portion translates axial movement of the splined member into rotary movement of the splined shaft. A pressurized fluid circuit is provided in the rotary actuator for delivery of pressurized fluid through the actuator to the implement. The circuit includes a feed manifold at the first end of the shaft, a delivery manifold at the second end of the shaft, and first and second channels fluidically coupling the feed manifold to the delivery manifold axially through the splined shaft. The feed and delivery manifolds may be rotatable with the splined shaft relative to the housing.

A mobile apparatus employing the rotary actuator of the present invention includes a mobile carriage, a pedestal supported by the mobile carriage, and a boom having a proximal portion coupled to the pedestal. An implement connection apparatus rotatably connects a pressurized fluid-driven implement to a distal portion of the boom for rotation of the implement about an actuator axis. The implement connection apparatus includes a rotary actuator having a housing defining a chamber, a shaft having first and second ends and extending axially through the chamber for rotation relative to the housing about the actuator axis. The shaft is rotated by a translator member that is axially driven parallel to the actuator axis in the chamber. The implement connection apparatus further includes a pressurized fluid circuit for delivery of a pressurized fluid through the rotary actuator to the implement. The circuit includes a feed manifold at the first end of the shaft, a delivery manifold at the second end of the shaft, and first and second channels fluidically coupling the feed manifold to the delivery manifold through the shaft. The feed and delivery manifolds are rotatable with the shaft relative to the housing.

A mobile apparatus includes a self-propelled mobile carriage including a frame, a pedestal pivotally mounted to the frame for pivoting about first and second substantially orthogonal pivot axes, a boom having a proximal portion pivotally mounted to the pedestal, a cutting apparatus, and a connection apparatus rotatably connecting the cutting apparatus to a distal portion of the boom for rotation of the cutting apparatus about an actuator axis. The connection apparatus includes a rotary actuator having a housing defining a chamber, a shaft having first and second ends and extending axially through the chamber for rotation relative to the housing about the actuator axis. The connection apparatus further includes a pressurized fluid circuit for delivery of pressurized fluid through the actuator to the cutting apparatus. The circuit includes a feed manifold at the first end of the shaft, a delivery manifold at the second end of the shaft, and first and second channels fluidically coupling the feed manifold to the delivery manifold through the shaft.

DETAILED DESCRIPTION OF THE INVENTION

The objects and advantages enumerated above together with other objects, features, and advances represented by the present invention will now be presented in terms of detailed embodiments described with reference to the attached drawing figures, which are intended to be representative of various possible configurations of the invention. Other embodiments and aspects of the invention are recognized as being within the grasp of those having ordinary skill in the art.

For the purposes of describing the apparatus of the present invention, the terms "up", "down", "horizontal", "vertical", "above", "below", "proximal", "distal", or similar related terms may be used herein to describe the component parts of the apparatus and their relative positions. Such terms are used for convenience in reference to the attached drawing figures, but should not be interpreted as limiting the scope of the present invention.

Figure 1:
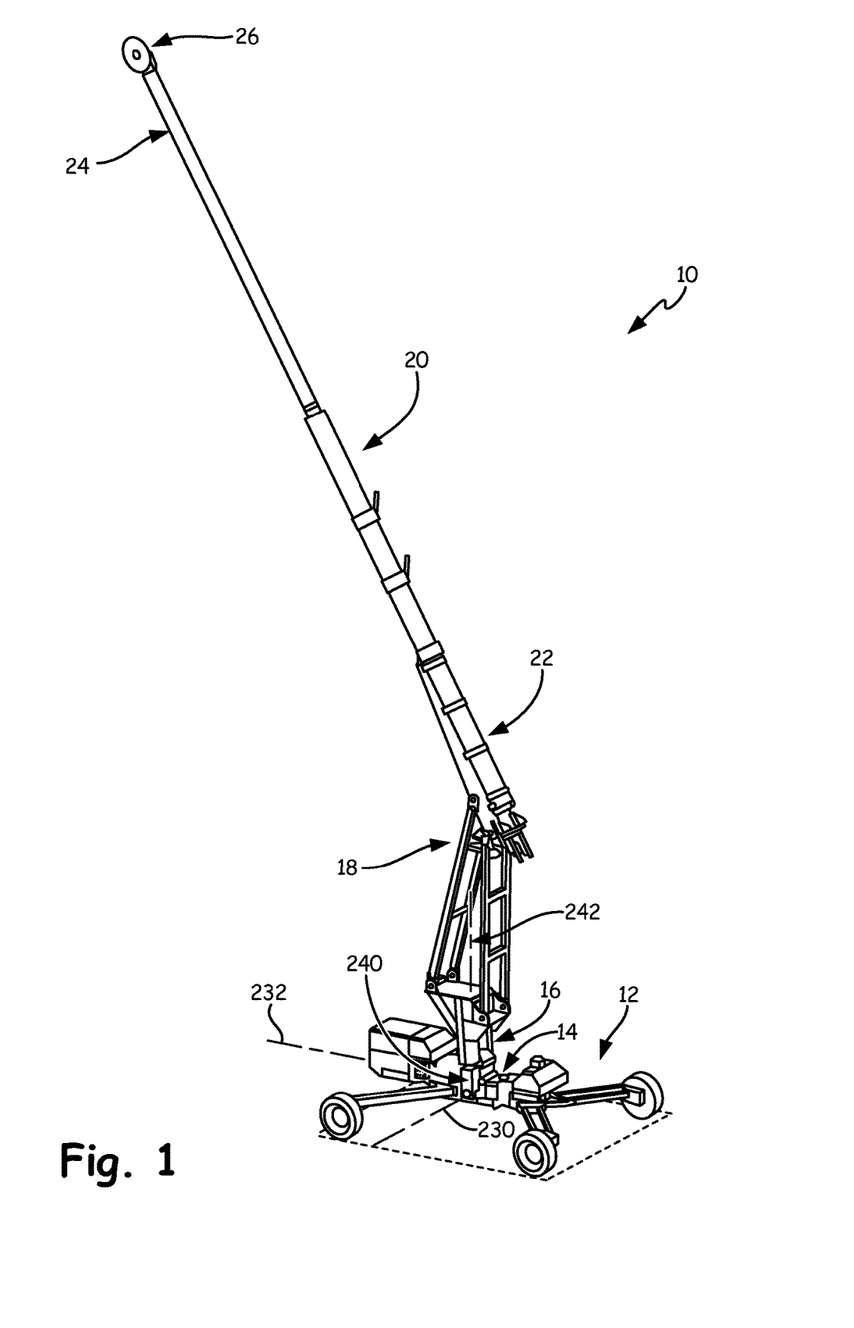
FIG. 1 is a schematic perspective illustration of the mobile apparatus of the present invention.

With reference now to the drawing figures, and first to FIG. 1, a mobile apparatus 10 includes a mobile carriage 12 with a frame 14 that supports a pedestal 16 and a boom support 18. A boom 20 includes a proximal end 22 and a distal end 24. Proximal end 22 of boom 20 may be secured to boom support 18. Mobile apparatus 10 may further include an operating implement 26 secured to boom 20. In the illustrated embodiment, operating implement 26 may include a cutting apparatus, such as a circular saw. Distal end 24 of boom 20 and operating implement 26 may be operably elevated substantially above carriage 12 by boom support 18.

An example mobile apparatus is described in co-pending U.S. patent application Ser. No. 13/819,844, assigned to the present Applicant assignee, and herein incorporated by reference. Another example mobile apparatus is described in U.S. Pat. No. 4,411,070, assigned to the present Applicant assignee, and incorporated herein by reference. The example mobile apparatus described in the above-cited references are adapted to be selectively driven to locations at which the operating implement, in some cases a cutting apparatus, may operably reach and cut vegetation. Such a procedure may be useful in, for example, right of way clearing for roadways and electrical power lines, storm damage repair and cleanup, and otherwise aesthetic vegetation removal. While such apparatus is described in terms of a tree-trimming device, it is contemplated that mobile apparatus 10 of the present invention may be useful in a variety of other configurations requiring the stable elevation of boom 20, and a rotatable operation of operating implement 26 at distal end 24 of boom 20. Such alternative applications include lift operations for lifting one or more persons in a bucket secured to boom 20, firefighting equipment, and other servicing equipment for servicing elevated positions such as elevated electrical power lines, window washing equipment, roofing equipment, and so on. Therefore, apparatus 10 should be considered as being useful in applications other than tree trimming operations, wherein operating implement 26 may include one or more of a variety of attachments rotatable secured to boom 20.

Figure 2:
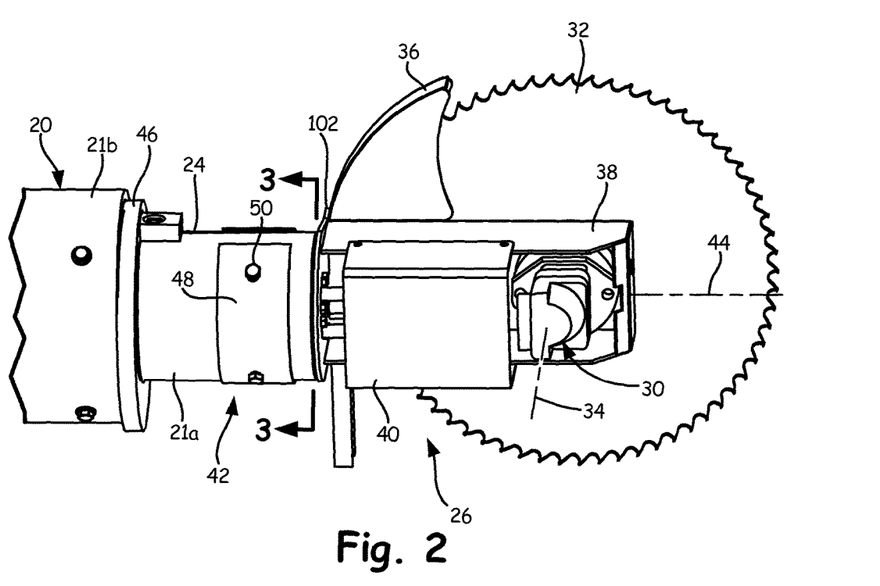
FIG. 2 is an enlarged view of a portion of the mobile apparatus illustrated in FIG. 1.

An enlarged view of an example operating implement 26 rotatably secured to distal end 24 of boom 20 is illustrated in FIG. 2. In the illustrated embodiment, operating implement 26 is a cutting apparatus including a pressurized fluid-operated motor 30 for driving a circular saw 32 about a saw axis 34. Motor 30 may be any of a variety of pressurized fluid-operated motors, including conventional hydraulic or pneumatic motors suitable for driving circular saw 32 at a high rotational speed. A saw guard 36 is supplied to help eliminate the possibility of debris being thrown backward in the direction of the operator. Saw guard 36 may be designed so that it allows a maximum amount of a cutting surface of circular saw 32 to be exposed while still affording protection to the operator. A motor housing 38 at least partially surrounds motor 30, and a debris guard 40 acts as a barrier to debris impacting pressurized fluid conduits for motor 30.

A connection apparatus 42 rotatably connects operating implement 26 to distal portion 24 of boom 20 for rotation of operating implement 26 about an actuator axis 44. In the illustrated embodiment, actuator axis 44 is parallel to boom 20, and may be substantially coextensive with a longitudinal axis of boom 20. Consequently, operating implement 26 may be rotated by connection apparatus 42 with respect to boom 20 about actuator axis 44 which, in this embodiment, is non-parallel to saw axis 34. In some embodiments, actuator axis 44 may be substantially perpendicular to saw axis 34. However, it is contemplated that connection apparatus 42 may be arranged to provide one or more rotation axes about which operating implement 26 may be rotated, including actuator axes that are non-perpendicular to saw axis 34.

Boom 20 may be telescopingly extendable, with an inner boom 21a telescopingly received in an outer boom 21b. An outer boom ring 46 preferably aids in maintaining the concentricity of inner boom 21a within outer boom 21b as inner boom 21a is telescopingly extended and retracted along a longitudinal boom axis. Outer boom ring 46 has an opening with a diameter that is substantially equal to, but slightly larger than, an outer diameter of inner boom 21a to retain inner boom 21a in a substantially coaxial alignment with outer boom 21b.

Figure 3:
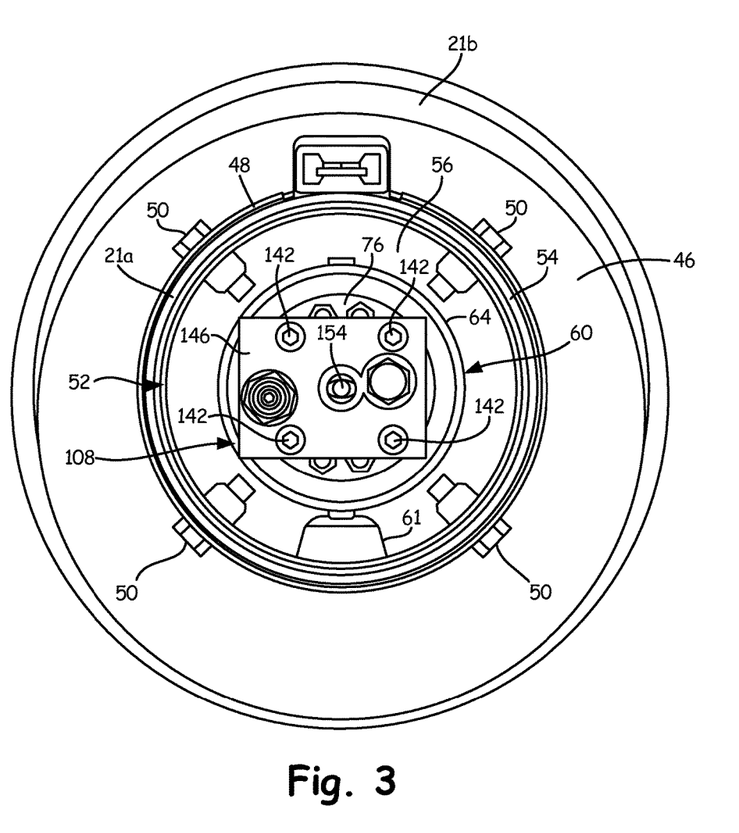
FIG. 3 is a cutaway end view of the apparatus illustrated in FIG. 2 along cut line 3-3.
Figure 4:
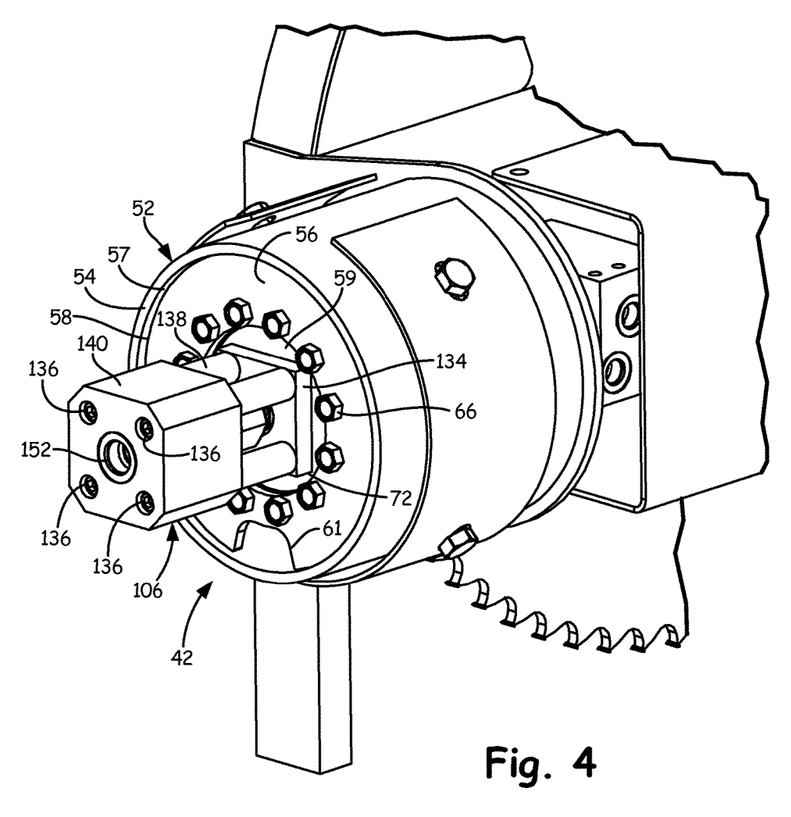
FIG. 4 is an isolation perspective view of a portion of the apparatus illustrated in FIGS. 1 and 2.

An end cutaway view of the apparatus is illustrated in FIG. 3. A mounting bracket 48 is externally affixed to inner boom 21a with bracket bolts 50, with the mounting bracket 48 serving as a brace to secure a connection shell 52 to an inner surface of inner boom 21a at distal end 24. Connection shell 52 includes a cylindrical portion 54 and a brace portion 56 that connects cylindrical portion 54 to rotary actuator 60. In some embodiments, brace portion 56 may be welded to cylindrical portion 54 to fixedly secure brace portion 56 with cylindrical portion 54, wherein the connection of cylindrical portion 54 to an inner surface of inner boom 21a affixes connection shell 52 with respect to inner boom 21a. A rear perspective view of connection apparatus 42 is shown in FIG. 4 with inner boom 21a removed from view. Brace portion 56 may be configured as a disk with an outer radial surface 58 secured to an inner surface 57 of cylindrical portion 54. In some embodiments, connection between brace portion 56 and cylindrical portion 54 may be made by welding or other techniques. Other arrangements for the securement of brace portion 56 to cylindrical portion 54 are also contemplated by the present invention, including embodiments wherein connection shell 52 is a unitary body formed without weldments or other securing means. Brace portion 56 may be substantially annular to define an inner opening 59 for access to rotary actuator 60 disposed within a chamber at least partially defined by cylindrical portion 54. Brace portion 56 may further include a cutout portion 61 to permit access to an annular space between rotary actuator 60 and cylindrical portion 54.

Figure 5:
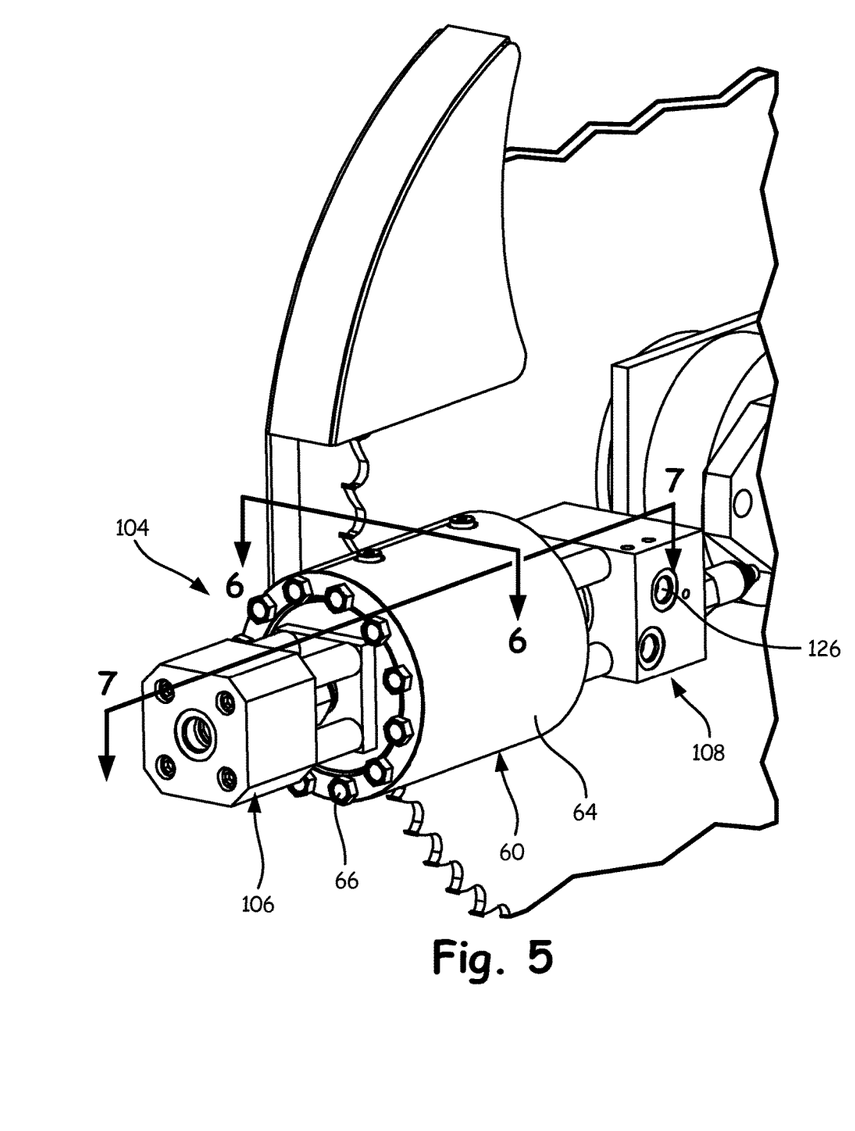
FIG. 5 is an isolation cutaway view of a portion of the apparatus illustrated in FIG. 4.

FIG. 5 illustrates connection apparatus 42 with additional parts removed, including connection shell 52, to reveal rotary actuator 60. An example actuator device useful for rotary actuator 60 is a helical, hydraulic rotary actuator available from Helac Corporation of Enumclaw, Wash., under model no. L10. An example helical rotary actuator description is provided in U.S. Pat. No. 5,447,095, herein incorporated by reference. Rotary actuator 60 may be operated to selectively rotate operating implement 26 about actuator axis 44. In this embodiment, rotary actuator 60 includes a housing 64 that is secured in place within connection shell 52 by housing bolts 66 secured through brace portion 56 and into housing 64. The fixed securement of housing 64 to brace portion 56 maintains rotary actuator 60 in a stationary secured relationship with respect to connection shell 52, and correspondingly to inner boom 21a through mounting bolts 50 and mounting bracket 48.

Figure 6:
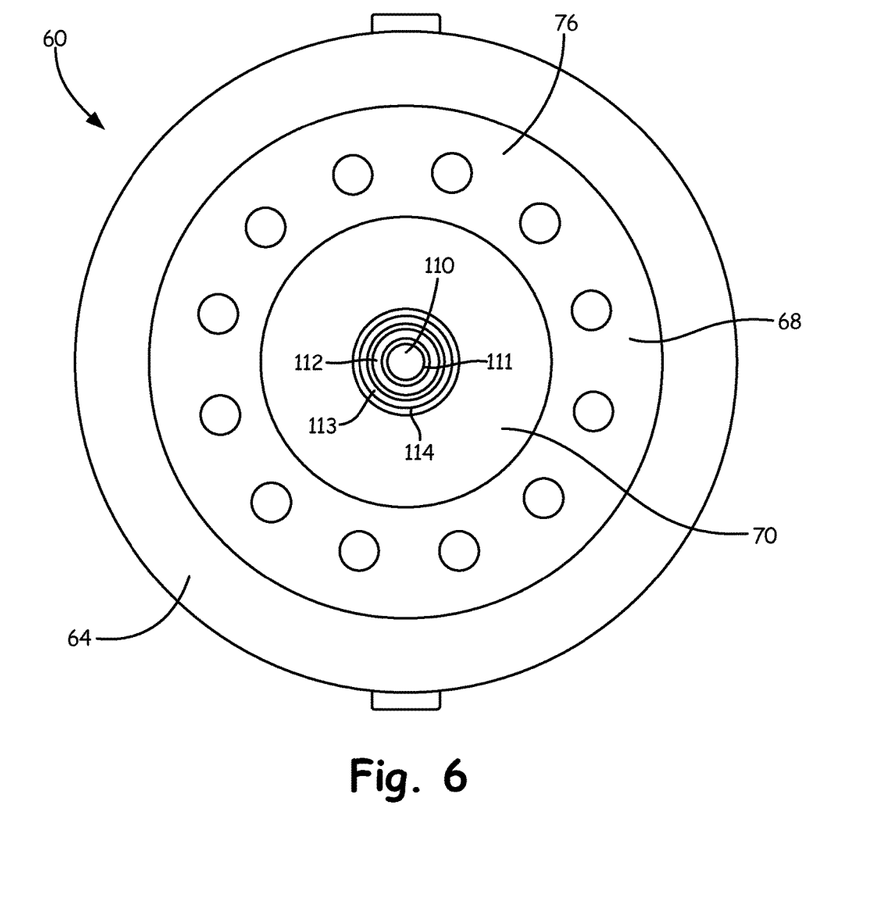
FIG. 6 is a cross-sectional view of a portion of the apparatus illustrated in FIG. 5, taken along cut line 6-6.
Figure 7:
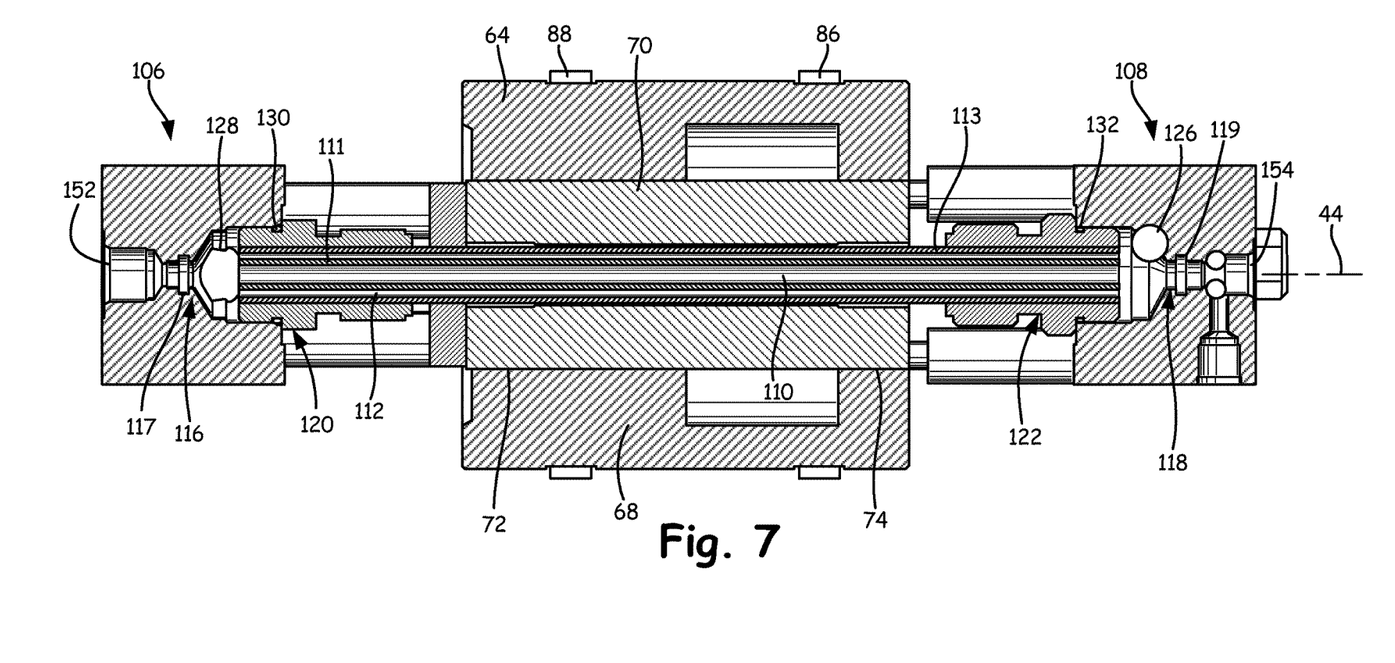
FIG. 7 is a cross-sectional view of a portion of the apparatus illustrated in FIG. 5, taken along cut line 7-7.
Figure 8:
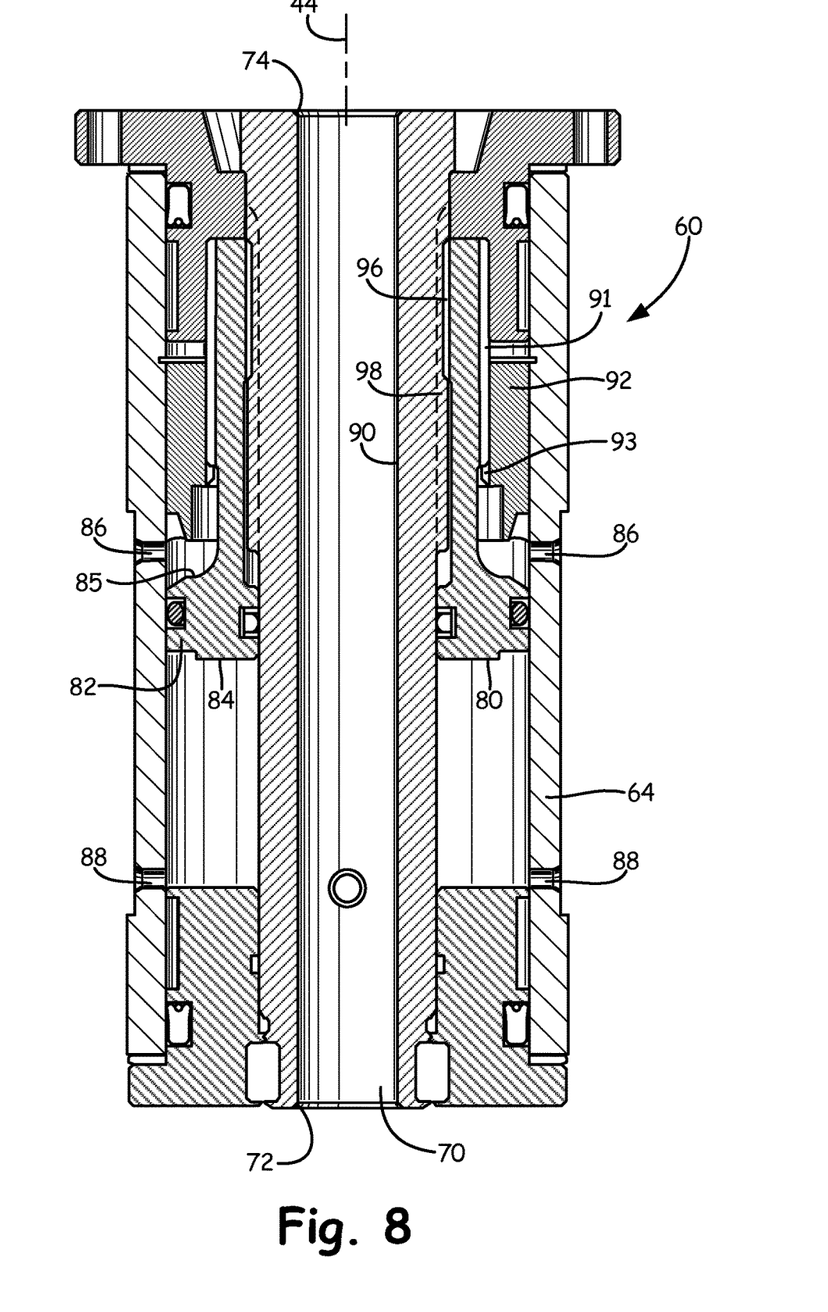
FIG. 8 is a cross-sectional view of a rotary actuator of the present invention.
Figure 9:
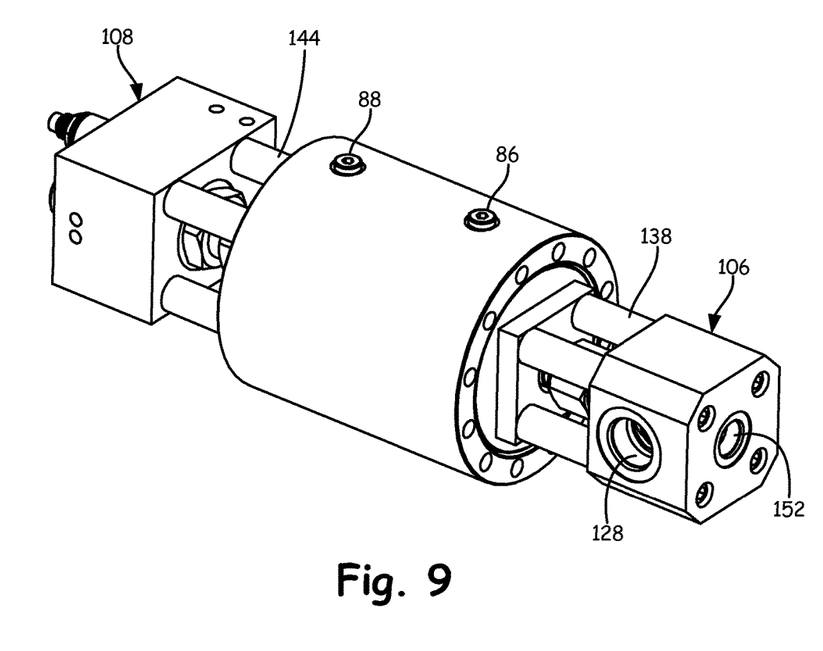
FIG. 9 is an isolation perspective view of a portion of the apparatus of the present invention.
Figure 10:
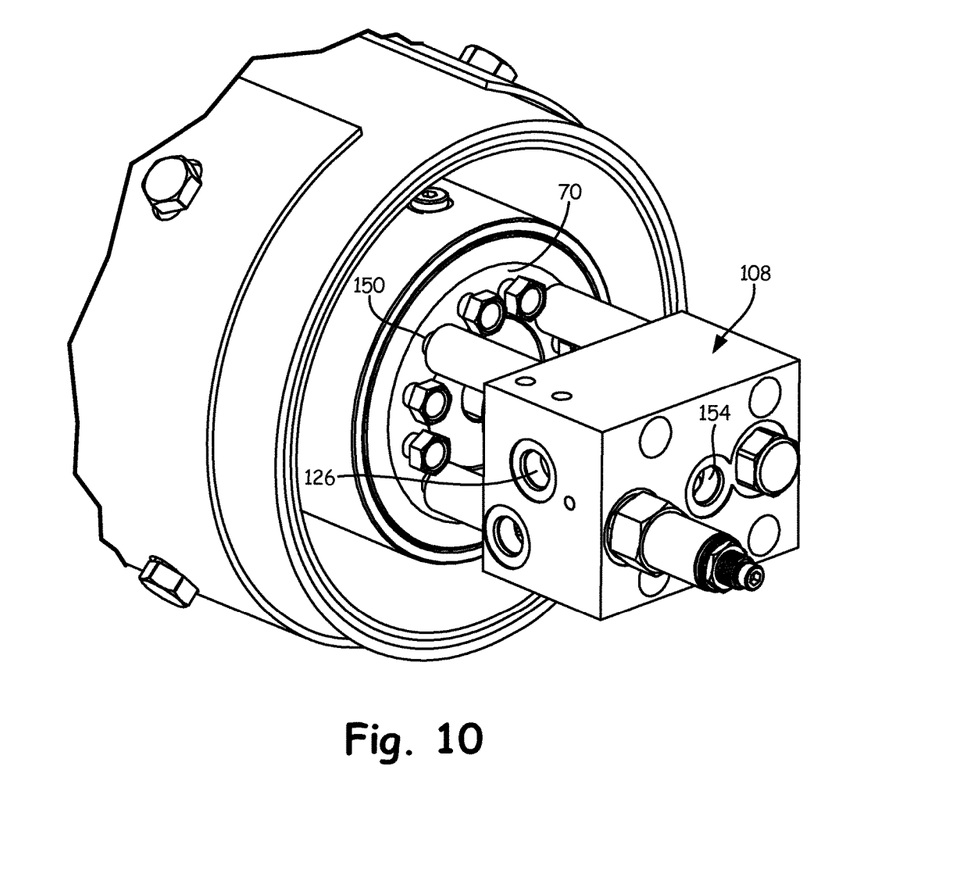
FIG. 10 is an isolation perspective view of a portion of the apparatus of the present invention.

A cross-sectional view of rotary actuator 60 taken along cut line 6 is illustrated in FIG. 6, with housing 64 defining a chamber 68. The interior components of rotary actuator 60 are shown schematically for the purpose of simplicity. A shaft 70 includes first and second ends 72, 74, and extends axially through chamber 68 for rotation relative to housing 64 about actuator axis 44. As described above, shaft 70 may be splined to operably engage with a piston sleeve to impart rotary motion to shaft 70. An output plate 76 is secured to second end 74 of shaft 70 for rotation with shaft 70. Shaft output plate 76, in the illustrated embodiment, is positioned at an end of rotary actuator 60 proximate to operating implement 26, such that operating implement 26 may be coupled to shaft output plate 76 for rotary motion with shaft 70.

In an example embodiment, rotary actuator 60 includes a piston 80 mounted in chamber 68 and axially responsive along actuator axis 44 to pressurized fluid at respective opposed sides 84, 85 of piston head 82. Pressurized fluid is selectively injected and removed from chamber 68 through first and second sets of fluid ports 86, 88. Axial reciprocation of piston 80 within chamber 68 occurs when the pressurized fluid selectively enters through a first port 86 to one side of piston head 82, or through a second port 88 at second side 85 of piston head 82. The application of pressurized fluid to one side of piston head 82 axially drives piston 80 along actuator axis 44. The movement of piston 80 correspondingly reciprocally axially drives a splined member 90 between splined shaft 70 and a grooved portion 92 in chamber 68. Meshed engagement among splined shaft 70, splined member 90, and grooved portion 92 translates axial movement of splined member 90 into rotary movement of splined shaft 70. In the illustrated embodiment, splined member 90 forms part of piston 80, so as to axially reciprocate therewith. Outer helical splines 91 of splined member 90 slidably engage or mesh with inner helical splines 93 of grooved portion 92 to cause rotation of splined member 90. The axial and rotational movement of splined member 90 is transmitted through inner helical splines 96 of splined member 90 slidably engaging or meshing with outer helical splines 98 of shaft 70, so as to cause shaft 70 to rotate relative to housing 64. The application of fluid pressure through port 86 produces axial movement of splined member 90 toward first end 72 of shaft 70. The application of fluid pressure through port 88 produces axial movement of splined member 90 toward second end 74 of shaft 70. Rotary actuator 60 provides relative rotational movement between housing 64 and shaft 70 through the conversion of this linear movement of splined member 90 into rotational movement of shaft 70.

An implement adaptor plate 102 may be bolted to shaft output plate 76 with shaft bolts 78, such that implement adaptor plate 102 rotates with shaft output plate 76 and correspondingly with shaft 70. Motor housing 38 may be welded or otherwise secured to implement adaptor plate 102. In this manner, operating implement 26 rotates with implement adaptor plate 102, and correspondingly with shaft 70.

An aspect of the present invention is the capability to deliver pressurized fluid to operating implement 26 through an internal, and thereby protected pathway. Pressurized fluid circuit 104 is preferably configured for delivery of pressurized fluid through rotary actuator 60 to operating element 26. Accordingly, pressurized fluid circuit 104 is adapted to transfer pressurized fluid between an interior of inner boom 21a and operating implement 26 through rotary actuator 60. Pressurized fluid circuit 104 includes a feed manifold 106 at first end 72 of shaft 70, a delivery manifold 108 at second end 74 of shaft 70, and first and second channels 110, 112 fluidically coupling feed manifold 106 to delivery manifold 108 axially through shaft 70. Preferably, first and second channels are coaxial with one another along actuator axis 44, so that both of first and second channels 110, 112 remain radially centered in shaft 70 as shaft 70 is rotated about actuation axis 44. First channel 110 may be defined as a lumen within a first channel tube 111 that is held coaxially in place within a second channel tube 113 at first channel tube fittings 116, 118 in feed manifold 106 and delivery manifold 108, respectively. Second channel tube 113 may be positioned within an axial bore 114 of shaft 70, and may be secured coaxially about first channel tube 111 at second channel tube fittings 120, 122 in feed manifold 106 and delivery manifold 108, respectively. Second channel 112 may therefore comprise an annular space between second channel tube 113 and an outer surface of first channel tube 111.

First channel tube fittings 116, 118 include machined grooves 117, 119 for receiving a securing and sealing ring, such as a resilient gasket in the form of an o-ring positioned about an outer surface of first channel tube 111. The securing/sealing gaskets both coaxially position first channel tube 111 within axial bore 114 of shaft 70, and also form a fluid-tight seal to second channel 112. In this manner, second channel 112 fluidically communicates only between a return inlet port 126 and a return outlet port 128, and thereby is sealed from fluidic communication with first channel 110. Machined grooves 130, 132 in respective second channel tube fittings 120, 122 may be configured to receive a resilient gasket for securing second channel tube 113 in place coaxially about actuation axis 44 through axial bore 114 in shaft 70. Second channel tube 113 may accordingly be secured coaxially about, and radially spaced from first channel tube 11, so as to define an annular second channel 112 between first and second channel tubes 111, 113.

Feed manifold 106 includes a mounting plate 134 press fit or otherwise secured to first end 72 of shaft 70. A series of feed manifold bolts 136 may secure feed manifold 106 through mounting plate 134 to first end 72 of shaft 70. In some embodiments, mounting plate 134 may include tapped and threaded recesses to threadably receive feed manifold bolts 136. In other embodiments, feed manifold bolts 136 may be threadably received directly into shaft 70 in order to secure feed manifold 106 to shaft 70. Feed manifold bolts 136 extend through bolt sleeves 138 to secure feed manifold head 140 to mounting plate 134, and ultimately to shaft 70.

A similar arrangement is provided for the securement of delivery manifold 108 to second end 74 of shaft 70. Namely, delivery manifold bolts 142 extend through bolt sleeves 144 to secure delivery manifold head 146 to second end 74 of shaft 70. In some embodiments, a mounting plate 148 is press-fit or otherwise secured to second end 74 of shaft 70 to act as an intermediate securing part to connect delivery manifold head 146 to second end 74 of shaft 70. Mounting plates 134, 148 may be arranged to rotate with shaft 70, such that feed and delivery manifolds 106, 108 are rotatable with shaft 70 relative to housing 64.

In some embodiments, delivery manifold bolts 142 may be configured to be threadably received in threaded sockets 150 of shaft 70. Such sockets 150 may be standard original equipment for rotary actuator 60 to facilitate the mounting of a body to shaft 70 for rotatable movement thereof with respect to housing 64.

Feed manifold 106 includes an inlet port 152 that fluidically communicates with first channel 110, but is fluidically disconnected from second channel 112 through the mounting arrangement of first channel tube 111 in feed manifold 106, as described above. Inlet port 152 may be arranged to securely receive a flexible tubing end to convey pressurized fluid from the flexible supply conduit, through inlet port 152, to first channel 110. Pressurized supply fluid may therefore be delivered through rotary actuator 60 via first channel 110 axially through shaft 70 to delivery manifold outlet port 154. A delivery tube (not shown) may convey pressurized supply fluid from delivery manifold outlet port 154 to pressurized fluid operated motor 30 for operating motor 30. Typically, pressurized fluid operated motors, such as motor 30, require a return of pressurized fluid to the pressurized fluid source. To accommodate such a return line, delivery manifold 108 includes a return inlet port 126 that fluidically communicates with second channel 112, but is fluidically disconnected from first channel 110. Consequently, return pressurized fluid from motor 30 may be directed through return inlet port 126 to second channel 112 axially through shaft 170 to return outlet port 128 in feed manifold 106. A pressurized fluid conduit may then convey the return pressurized fluid from return outlet port 128 to the pressurized fluid source. An example pressurized fluid circuit therefore conveys pressurized fluid along a path through feed manifold inlet port 152, through first channel 110, and through delivery manifold outlet port 154 to a conduit conveying the pressurized fluid to pressurized fluid-operated motor 30. The circuit continues by returning pressurized fluid from motor 30 through a fluid conduit to return inlet port 126 in delivery manifold 108, and through second channel 112 to return outlet port 128 in feed manifold 106, wherein a conduit conveys the return pressurized fluid to the pressurized fluid source.

Rotary actuator 60 actuates as a result of reciprocal axial motion of piston 80, which moves as the result of pressurized fluid alternately supplied to fluid ports 86, 88. Rotary actuator pressurized fluid supply lines may be routed through an interior of inner boom 21*a* through cutout portion 61 in brace portion 56 of connection shell 52, so as to connect to fluid ports 86, 88 at housing 64 of rotary actuator 60. In this manner, the pressurized fluid supply lines to rotary actuator 60 may be contained within an interior environment not exposed to the external hazards introduced in the operation of implement 26. Moreover, such pressurized fluid supply lines connect to the rotary static housing 64 of rotary actuator 60, in that such supply lines do not rotate with shaft 70. Accordingly, the pressurized fluid supply lines to rotary actuator 60 may avoid tangling and damage that can result with twisting of fluid supply lines.

With reference back to FIG. 1, pedestal 16 of apparatus 10 may be supported by frame 14, and may be pivotable about first and second substantially orthogonal axes 230, 232. A pivot mechanism 240 may actuate pedestal 16 individually or simultaneously about such first and second axes 230, 232, such that pedestal 16 may be actuated about a partial spheroid to a desired extent. In one embodiment, pedestal 16 may be tilted up to a 20° attitude relative to a vertically oriented central axis 242. Boom support 18 is capable of pivoting boom 20 relative to pedestal 16.

The invention has been described herein in considerable detail in order to comply with the patent statutes and to provide those skilled in the art with the information needed to apply the novel principles and to construct and use embodiments of the invention as required. However, it is to be understood that various modifications can be accomplished without departing from the scope of the invention itself.

What is claimed is:

1. A rotary actuator for selectively rotating a pressurized fluid-driven implement about an actuator axis, said actuator comprising:

a housing defining a chamber;

a splined shaft having a first end and a second end, and extending axially through said chamber for rotation relative to said housing about said actuator axis, one of said housing and said shaft being configured for coupling to the implement;

a piston mounted in said chamber and axially responsive to pressurized fluid in said chamber to reciprocally axially drive a splined member between said splined shaft and a grooved portion in said chamber, wherein meshed engagement among said splined shaft, said splined member, and said grooved portion translates axial movement of said splined member into rotary movement of said splined shaft; and a pressurized fluid circuit for delivery of pressurized fluid through said actuator to the implement, said circuit having a feed manifold at said first end of said shaft, a delivery manifold at said second end of said shaft, and first and second channels fluidically coupling said feed manifold to said delivery manifold axially through said splined shaft, wherein said feed and delivery manifolds are rotatable with said splined shaft relative to said housing.

2. A rotary actuator as in claim 1 wherein said first and second channels are coaxial with each other along said actuator axis.

3. A rotary actuator as in claim 2, including an inlet port in said feed manifold fluidically communicating with said first channel, but fluidically disconnected from said second channel.

4. A rotary actuator as in claim 3, including a return outlet port in said feed manifold fluidically communicating with said second channel, but fluidically disconnected from said first channel.

5. A rotary actuator as in claim 4, including an outlet port in said delivery manifold fluidically communicating with said first channel, but fluidically disconnected from said second channel.

6. A rotary actuator as in claim 5, including a return inlet port in said delivery manifold fluidically communicating with said second channel, but fluidically disconnected from said first channel.

7. A rotary actuator as in claim 6, wherein said pressurized fluid circuit is adapted to convey pressurized fluid along a path through said inlet port, said first channel, said outlet port, said return inlet port, said second channel, and said return outlet port.

8. A rotary actuator as in claim 7, wherein said pressurized fluid operates the implement.

9. A rotary actuator as in claim 8, wherein the implement includes a rotary saw.

10. A rotary actuator as in claim 7, including a feed transfer conduit for conveying pressurized fluid from a pressurized fluid source to said feed manifold.

11. A rotary actuator as in claim 10, including a return transfer conduit for conveying pressurized fluid from said implement to said delivery manifold.

12. A mobile apparatus, comprising:

a mobile carriage;

a pedestal supported by said mobile carriage;

a boom having a proximal portion coupled to said pedestal;

an implement connection apparatus rotatably connecting a pressurized fluid-driven implement to a distal portion of said boom for rotation of said implement about an actuator axis, said implement connection apparatus including:

(i) a rotary actuator having a housing defining a chamber, a shaft having first and second ends and extending axially through said chamber for rotation relative to said housing about said actuator axis, said shaft being rotated by a translator mechanism that is axially driven parallel to said actuator axis in said chamber; and (ii) a pressurized fluid circuit for delivery of pressurized fluid through said rotator actuator to said implement, said circuit having a feed manifold at said first end of said shaft, a delivery manifold at said second end of said shaft, and first and second channels fluidically coupling said feed manifold to said delivery manifold axially through said shaft, wherein said feed and delivery manifolds are rotatable with said shaft relative to said housing.

13. A mobile apparatus as in claim 12 wherein said first and second channels are coaxial with each other along said actuator axis.

14. A mobile apparatus as in claim 12 wherein said pressurized fluid-driven implement includes a fluid pressure operated motor operably coupled about a saw axis that is non-parallel to said actuator axis.

15. A mobile apparatus as in claim 14 wherein said pressurized fluid-driven implement is secured to said second end of said shaft.

16. A mobile apparatus as in claim 12 wherein said translator mechanism includes helical grooves that operably mesh with splines at an outer surface of said shaft to translate axial movement of said translator mechanism to rotational movement of said shaft.

17. A mobile apparatus as in claim 12, including a pivot mechanism for pivoting said pedestal relative to said carriage about first and second substantially orthogonal pivot axes.

18. A mobile apparatus as in claim 17, including a boom support for pivoting said boom relative to said pedestal.

19. A mobile apparatus as in claim 18 wherein said boom is telescopingly extendable.

20. A mobile apparatus, comprising:

a self-propelled mobile carriage including a frame;

a pedestal pivotally mounted to said frame for pivoting about first and second substantially orthogonal pivot axes;

a boom having a proximal portion pivotally mounted to said pedestal;

a cutting apparatus;

a connection apparatus rotatably connecting said cutting apparatus to a distal portion of said boom for rotation of said cutting apparatus about an actuator axis, said connection apparatus including:

(i) a rotary actuator having a housing defining a chamber, a shaft having first and second ends and extending axially through said chamber for rotation relative to said housing about said actuator axis; and (ii) a pressurized fluid circuit for delivery of pressurized fluid through said rotator actuator to said implement, said circuit having a feed manifold at said first end of said shaft, a delivery manifold at said second end of said shaft, and first and second channels fluidically coupling said feed manifold to said delivery manifold axially through said shaft, wherein said feed and delivery manifolds are rotatable with said shaft relative to said housing.

21. A mobile apparatus as in claim 20 wherein said first and second channels are coaxial with each other along said actuator axis.

22. A mobile apparatus as in claim 20 wherein said cutting apparatus includes a pressurized fluid operated motor for driving a circular saw about a saw axis.

* * * * *